United States Patent
Provost et al.

(10) Patent No.: US 7,451,532 B2
(45) Date of Patent: Nov. 18, 2008

(54) FORMING DISCRETE FASTENER ELEMENT REGIONS

(75) Inventors: George A. Provost, Litchfield, NH (US); William H. Shepard, Amherst, NH (US); William P. Clune, Northwood, NH (US)

(73) Assignee: Velcro Industries B.V., Curacao (NL)

( * ) Notice: Subject to any disclaimer, the term of this patent is extended or adjusted under 35 U.S.C. 154(b) by 168 days.

(21) Appl. No.: 11/336,321

(22) Filed: Jan. 20, 2006

(65) Prior Publication Data

US 2006/0117537 A1   Jun. 8, 2006

Related U.S. Application Data

(60) Division of application No. 10/725,819, filed on Dec. 1, 2003, now Pat. No. 7,056,462, which is a continuation of application No. PCT/US02/16898, filed on May 29, 2002.

(60) Provisional application No. 60/294,401, filed on May 29, 2001.

(51) Int. Cl.
 *A44B 18/00* (2006.01)
(52) U.S. Cl. ....................................................... 24/442
(58) Field of Classification Search ........................ None
 See application file for complete search history.

(56) References Cited

U.S. PATENT DOCUMENTS

| | | | |
|---|---|---|---|
| 4,732,800 A | 3/1988 | Groshens | |
| 5,057,259 A | 10/1991 | Parmelee | |
| 5,731,056 A * | 3/1998 | Butler, III | .................... 428/100 |
| 5,851,467 A | 12/1998 | Murasaki | |
| 6,202,260 B1 | 3/2001 | Clune et al. | |
| 6,287,665 B1 | 9/2001 | Hammer | |
| 6,656,403 B1 | 12/2003 | Clune et al. | |
| 2001/0001283 A1 | 5/2001 | Kennedy et al. | |
| 2001/0018110 A1 | 8/2001 | Tuman et al. | |
| 2004/0187275 A1 | 9/2004 | Kennedy et al. | |

FOREIGN PATENT DOCUMENTS

| | | |
|---|---|---|
| EP | 0324577 | 7/1989 |
| EP | 0741979 | 7/2001 |
| WO | WO 95/03723 | 2/1995 |
| WO | WO 00/00053 | 6/1998 |
| WO | WO00/27721 | 5/2000 |
| WO | WO 00/50229 | 8/2000 |

* cited by examiner

*Primary Examiner*—Jack W. Lavinder
(74) *Attorney, Agent, or Firm*—Fish & Richardson P.C.

(57) ABSTRACT

A method of making a fastener product having discrete regions of fastener element stems extending from a strip-form base includes providing a gap formed along a peripheral surface of a rotating mold roll, the mold roll having a plurality of cavities exposed about the peripheral surface. A sleeve is introduced to the gap. The sleeve is positioned about the mold roll and covers selected cavities. Molten resin is introduced to the gap such that the resin forms at least a part of the strip-form base of the product at the peripheral mold roll surface and at least partially fills a plurality of the cavities to form fastener element stems as projections extending from the strip-form base, while the resin remains blocked from said selected ones by the sleeve. The resin is solidified and stripped from the peripheral surface of the mold roll by pulling the projections from their respective cavities.

16 Claims, 5 Drawing Sheets

FORMING DISCRETE FASTENER ELEMENT REGIONS

CROSS-REFERENCE TO RELATED APPLICATIONS

This application is a divisional of U.S. application Ser. No. 10/725,819, filed Dec. 1, 2003, now U.S. Pat. No. 7,056,462, which is a continuation of International Application No. PCT/US02/16898, with an International Filing Date of May 29, 2002, now pending, which claims benefit from U.S. Provisional Patent Application No. 60/294,401, filed May 29, 2001, now expired.

TECHNICAL FIELD

This invention relates to fastener products and methods and apparatus of their manufacture, and more particularly to forming discrete fastener element regions on such products.

BACKGROUND

Fastener products having a base substrate with fastener elements for engagement with loops or like fastener elements can be continuously produced from, e.g., a thermoplastic material. Typically, methods for producing such fastener products result in tape-like substrates having a continuous pattern of fastener elements extending across an entire surface or in uniform bands or rows along the length of the substrate. Often times, however, it would be advantageous in applications for such fastener products, to have the presence of the fastener elements limited to pre-selected zones or arranged in patterned areas along the substrate.

For example, there are some applications where it would be desirable to have patterned fastener element, e.g., hook, areas with adjacent areas that lack fastener element protrusions on a common web. Currently any such fastener products are generally made by multi-step forming, cutting and joining operations because most hook products are limited to complete or at least continuous hook coverage across or along the length of the hook bearing web. Providing hook products having other configurations would generally require specially designed tooling, e.g., hook forming mold cavity rolls with flat areas and hook forming cavity areas in the desired configuration. However, if the desired hook bearing shape and/or pattern is subsequently changed, the specialty tool would require redesign and or rebuilding to accommodate the change.

SUMMARY

In one aspect, the invention provides a fastener product including a longitudinally extending strip-for m base and a plurality of longitudinally discrete regions of fastener element stems, each discrete region including a thermoplastic resin layer bonded to a second base material by an intermingling of the resin of the resin layer with the second base material, the fastener element stems being molded, integral extensions of the resin from the resin layer, wherein each longitudinally discrete region is surrounded by an area of the strip-form base that is free of the fastener element stems.

Variations of this aspect of the invention can include one or more of the following features in any combination. The second base material is a barrier layer. The second base material is a backing substrate. The area of the strip-form base that is free of the fastener element stems is covered with a barrier material. The barrier material forms a lamination barrier. The lamination barrier is one of an overprint varnish and an overprint ink. The barrier material is one of a fabric, a paper, or a film. The barrier material is a fabric with engageable loops. The fastener element stems have engaging heads. The engaging heads are molded substantially simultaneously with the fastener element stems. The engaging heads are formed by a post-molding operation.

In another aspect, the invention provides a method of making a fastener product having discrete regions of fastener element stems extending from a strip-form base. The method includes: providing a gap formed along surface a peripheral of a rotating mold roll, the mold roll having a plurality of cavities exposed about the peripheral surface; introducing a barrier material to the gap, the barrier material covering selected ones of said plurality of cavities; continuously introducing molten resin to the gap such that the resin forms at least a part of the strip-form base of the product at the peripheral mold roll surface and at least partially fills a plurality of the cavities to form fastener element stems as projections extending from the strip-form base, while the resin remains blocked from said selected ones by the barrier material; solidifying the resin, and stripping the solidified resin from the peripheral surface of the mold roll by pulling the projections from their respective cavities.

Variations of this aspect of the invention can include one or more of the following features in any combination. The cavities are stem-shaped, the projections extending from the strip-form base to a stem top. The method further includes a step of deforming the stem tops to form loop-engaging heads on the projections. The cavities include a loop-engaging head shape so that the projections formed from the cavities include a loop-engaging head. The barrier material is a sleeve positioned about the mold roll, the sleeve covering selected ones of the plurality of mold cavities and having an aperture (or many apertures)for exposing other cavities for the formation of a discrete region (or many discrete regions)of the fastener element stems. The barrier material is an endless belt positioned to continuously pass through the gap, the belt covering selected ones of the plurality of mold cavities and having an aperture (or many apertures in a repeating or non-repeating pattern)for exposing other cavities for the formation of one or more discrete regions of the fastener element stems. The barrier material becomes permanently bonded to the resin to form part of the strip-form base. An exposed portion of the barrier material is engageable by the engaging heads of the fastener element stems.

In another aspect, the invention provides a method of making a fastener product having an array of fastener element stems protruding from a longitudinally extending strip-form base, the fastener element stems being permanently bonded to the strip-form base in only discrete regions by way of a thermoplastic resin layer that is permanently bonded to the strip form base. The method includes: continuously introducing molten resin to a gap formed along a peripheral surface of a rotating mold roll, such that the resin at least partially fills an array of fixed cavities defined in the rotating mold roll to form fastener element stems projecting from a surface of the sheet-form base; while continuously introducing a backing substrate to the molten resin while the resin is disposed in the gap, the backing material being selectively coated with a lamination barrier material to form coated areas and uncoated areas, the backing material being introduced under conditions selected to cause the material to become permanently bonded to the resin only in the uncoated areas; solidifying the resin; and stripping the solidified resin from the peripheral surface of the mold roll by pulling the fastener element stems from their respective cavities. Variations of this aspect of the invention can include on or more of the following features in any combination. The method further includes a step of cutting the solidified resin only along a transition line formed at an intersection of the coated areas and the uncoated areas while leaving the backing material intact. The method further includes a step of stripping the backing material away from unbonded solidified resin to leave discrete regions of fastener element stems permanently bonded to the backing material. The backing material is a printable cloth. The backing material is non-woven. The backing material is a plastic film. The lamination barrier material is one of an overprint varnish or an overprint ink. The fastener element stems are molded to have engaging heads. The method further includes a step of deforming tops of the fastener element stems to form engaging heads. The method includes leaving a portion of the unbonded regions of the backing material and the solidified resin intact to form a tab feature, wherein a separate substrate can be attached, e.g., by adhesive or otherwise, to the tab by either inserting the separate substrate between the unbonded portions of the backing material and the solidified resin, or by placing the separate substrate beneath a bonded portion of the backing substrate and folding an unbonded portion of the backing substrate to sandwich the separate substrate between bonded and unbonded portions of the backing substrate.

In another aspect, the invention provides any of the fastener products produced by the methods discussed above or disclosed herein.

The details of one or more embodiments of the invention are set forth in the accompanying drawings and the description below. Other features, objects, and advantages of the invention will be apparent corn the description and drawings, and from the claims.

DESCRIPTION OF DRAWINGS

FIG. 3A is a view similar to that of FIG. 3 of an alternate fastener product.

FIG. 9 is an end view of a method and apparatus for forming a fastener product while FIG. 9A is a magnified side view of a portion taken on lines 9A-9A of FIG. 9.

FIGS. 11-11A are, respectively, magnified, diagrammatic plan and cross-sectional views of a portion of an intermediate fastener product while FIG. 11B is a further magnified view along line 11B of FIG. 11A.

DETAILED DESCRIPTION

Referring to FIGS. 1, 1A, 2 and 2A, the invention provides various methods for forming fastener products having a longitudinally extending (direction of arrow A) strip-form base with longitudinally discrete fastener element bearing regions 14. Each fastener element bearing region 14 is surrounded by an area 13 that is free of fastener elements. Fastener element bearing regions 14 can be created on fastener product 10 in a repeating or non-repeating pattern and the pre-determined shape of each can be modified as desired, in accordance with the application for which the fastener product is intended. Each fastener element bearing region 14 includes an array of fastener elements 16, which extend from base 12. In turn, each fastener element 16 has a stem 18 and an engaging head, which is capable of engaging like or unlike fastener elements, or a loop material. Engaging head 20 is hook-shaped to overhang base 14 and to thereby provide for engagement, while in an alternate embodiment (FIG. 2A)engaging head 20 is in the form of a disc-shape that overhangs base 14 to provide for engagement.

Figure 1:
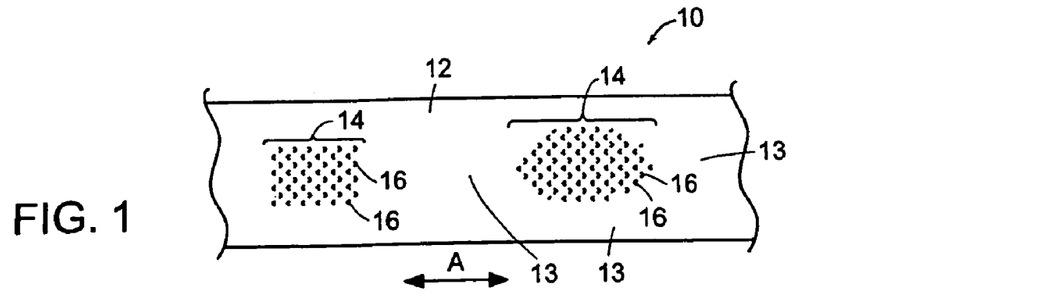
FIG. 1 illustrates various methods and apparatus for forming a fastener product with discrete fastener element bearing regions.
Figure 3:
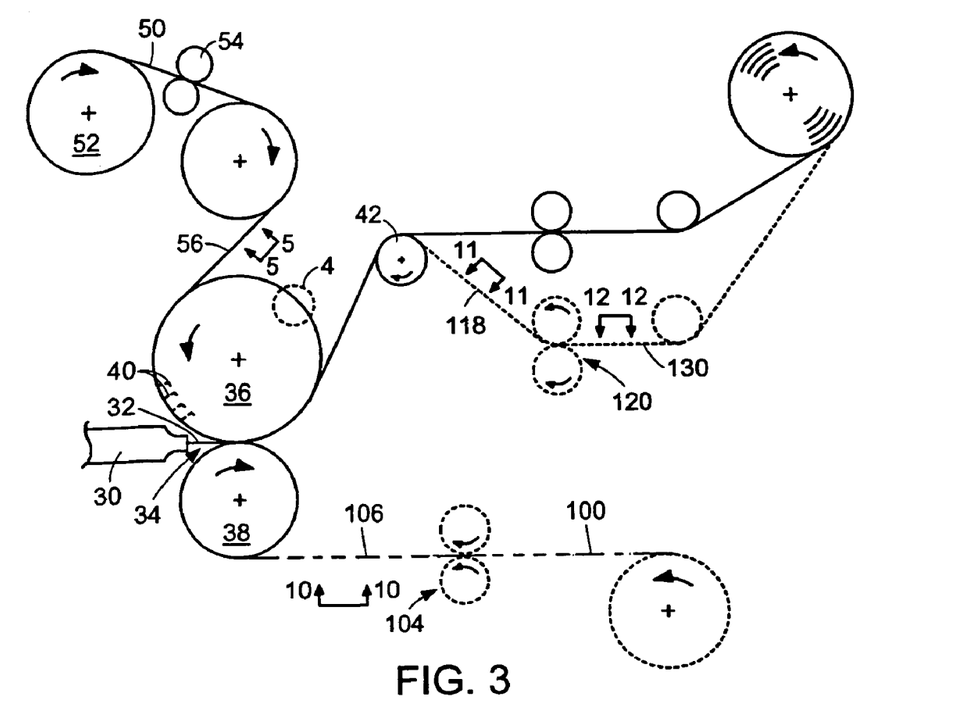
FIG. 3 is an unscaled cross sectional view of the fastener product having discrete fastener element bearing regions produced by the method and apparatus of FIG. 1.

Referring now to FIG. 3, various methods are illustrated for providing fastener products such as, e.g., the aforementioned product 10. The methods build upon the continuous extrusion/roll-forming methods for molding fastener elements on an integral, sheet-form base described by Fischer in U.S. Pat. No. 4,794,028, and the nip lamination processes described in Kennedy, et al. in U.S. Pat. No. 5,260,015, the details of both of which are incorporated herein by reference. The relative positions and sizes of the rolls and other components illustrated in FIG. 1 are schematic and are not to scale. An extrusion head 30 supplies a continuous sheet of molten resin 32 to a nip 34 between a molding roll 36 and a counter rotating pressure roll 38. Mold roll 36 contains an array of miniature, mold cavities 40 extending inward from its periphery for molding at least a portion of the fastener elements. The array of cavities 40 extends substantially about the entire periphery of mold roll 36. Pressure in the nip 34 forces resin 32 to enter and at least partially fill the exposed mold cavities 40, while excess resin forms a base substrate from which the fastener elements extend, as further described below. The formed product is cooled on the mold roll until the solidified fastener elements (e.g., hooks) are stripped from their fixed cavities by a stripper roll 42.

Figure 4:
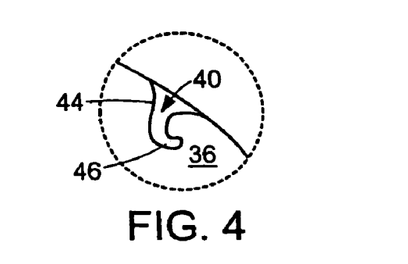
FIGS. 4-4B are unscaled side and cross-sectional views of a tight fitting metal sleeve with cutouts for use in an alternate method of producing fastener products having discrete hook-bearing regions.
Figure 4A:
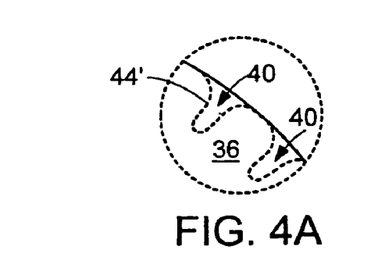
Figure 4B:
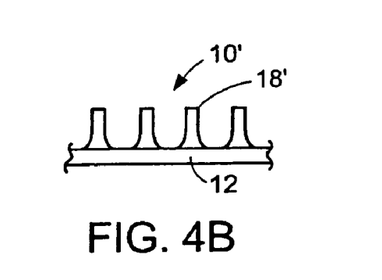

Referring now also to FIGS. 4, 4A and 4B, in some embodiments (FIG. 4), cavities 40 of mold roll 36 have a stem forming portion 44 and an engaging head forming portion 46 so as to form stems having engaging heads during the molding process. The result, for example, can be a fastener product having molded fastener elements such as those illustrated and discussed above with reference to FIG. 2A. In these embodiments, the solidified product stripped from mold roll 36 has fastener elements capable of engagement. In other embodiments (FIG. 4A), cavities 40 of mold roll 36 have only a stem forming portion 44. In these embodiments, the product 10 (FIG. 4A ) stripped from mold roll 36 has stems 18, extending from base 12 which can be post-treated to form engaging heads. For example, after molding and stripping the product from mold roll 36, the tops of the molded stems can be deformed by pressure and/or heat to create discs or other shapes that overhang the base of the product and are capable of engaging, e.g., loop material or like fastener elements.

Figure 5:
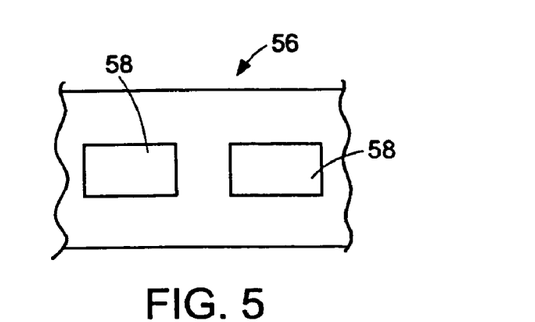
FIG. 5 is an unscaled cross sectional view of a fastener product having discrete fastener element bearing regions produced by the metal sleeve of FIGS. 4 and 4A in conjunction with certain methods paratus of FIG. 1.
Figure 6:
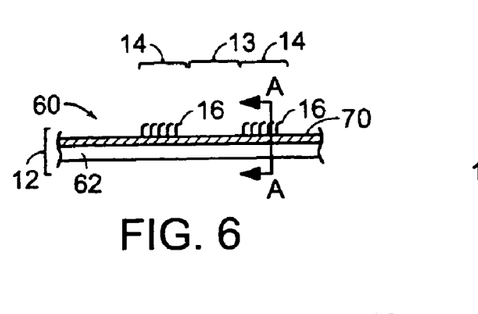
FIG. 6 is a sectional view of a packing film or other suitable material with discrete areas of overprint coating.
Figure 6A:
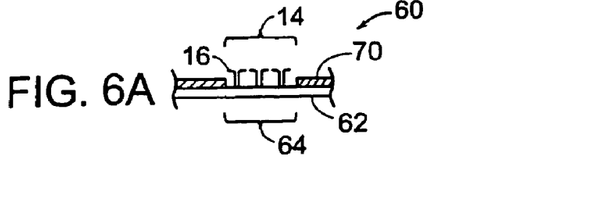

Referring still to FIG. 3 and now also to FIG. 5, a number of methods can be employed to prevent the formation of fastener element stems and/or fastener elements on selected areas while forming longitudinally discrete hook bearing zones or regions on other areas of the base of the fastener product. In one embodiment, a thin layer of material such as fabric or paper 50 may be fed from a roll 52 and die cut in a pattern or otherwise by a rotary die station 54 to form a barrier 56 (see FIG. 5) having apertures 58. Barrier material 56 can then be introduced into the nip 34 between mold roll 36 and molten resin 32 thus covering selected areas of the periphery surface of mold roll 36, and thereby shielding any mold cavities 40 corresponding to these covered areas from resin 58, while exposing other areas of the mold roll periphery surface, which coincide with apertures 58, to the resin. Pressure in nip 34 forces molten resin 32 into any mold roll cavities 40 that correspond with apertures 58 of barrier material 56, while those cavities covered by barrier material 56 remain empty. Meanwhile, thermoplastic resin 32 in excess of the exposed cavity volume is bonded to one surface of the barrier material 14. The resulting continuous fastener product 60 (see FIG. 6), like product 10 described above with reference to FIGS. 1A1, and has a strip-form base 12 with integrally molded, discrete zones 14 of fastener elements 16 (or, at least fastener element stems, which can be later post-formed, as described above). In the case of product 60, base 12 is made up of a thermoplastic support layer 62, from which the discrete zones 14 of fastener elements 16 are integrally molded to extend, the discrete zones 14 of fastener elements 16 protruding through openings 68 of a laminated barrier layer 70.

Figure 7:
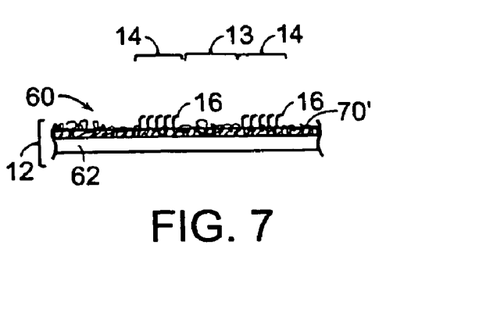
FIG. 7 is a sectional view of a tab feature.

Referring again to FIG. 5, it is noted that, of course, the openings 58 cut into barrier material 56 m ay vary in size and shape and m ay be arranged in a patterned, or unpatterned series to produce correspondingly shaped and patterned discrete zones of hook 14 on fastener product 60. Barrier material 56 can be, for example, a paper, nonwoven, knit loop, or fabric material. In some cases, referring again to FIG. 3 and now as well to FIG. 7, barrier material 56 is engageable by the fastener elements 16, e.g., barrier material 56 is a suitable loop material. Again, this barrier material is die cut prior to feeding it through nip 34 to provide openings, e.g., apertures 58, for the formation of hook zones 14. The resulting fastener product 60 (FIG. 7) has "self fastening" capability, i.e., hook zones 14 are capable of engaging the exposed loops of laminated loop barrier material 70.

Figure 8:
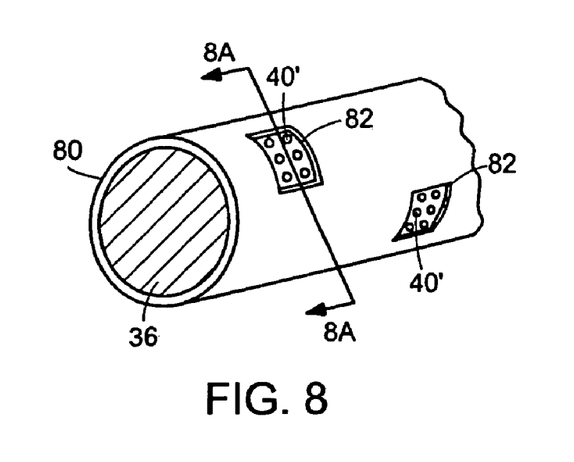
FIG. 8 is a sectional view of a fastened tab feature.
Figure 8A:
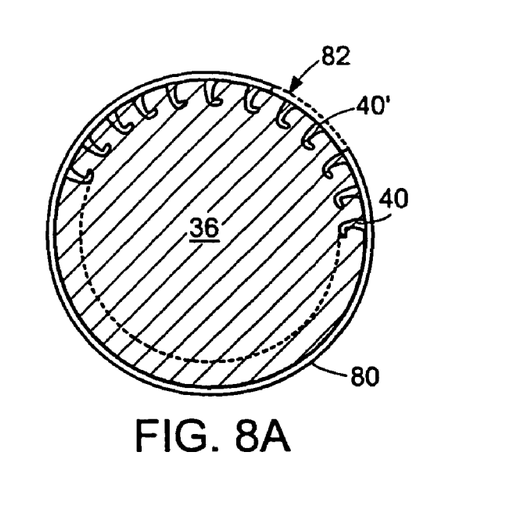

Referring still to FIG. 3 and now also to FIGS. 8 and 8A, another method for producing a fastener product having discrete fastener element bearing regions utilizes a cylindrical sleeve 80 having apertures 82 located about its periphery. Sleeve 80 is positioned over the peripheral molding surface of mold roll 36 during the molding process so that the sleeve serves as a barrier to prevent molten resin (e.g., resin 32 in FIG. 3) from entering mold cavities that do not correspond with openings 82, while allowing resin to enter cavities 40 that do correspond with openings 82. The result is a product such as fastener product 10 (FIGS. 1 and 1A) with a base 12 made up of thermoplastic resin and a number of discrete zones 14 of molded fastener elements 16 (or fastener element stems, as described above)extending integrally from the base. Advantageously, by using sleeve 80, no barrier material is expended, i.e., the barrier material does not become permanently bonded to the fastener product as it is produced.

Figure 1A:
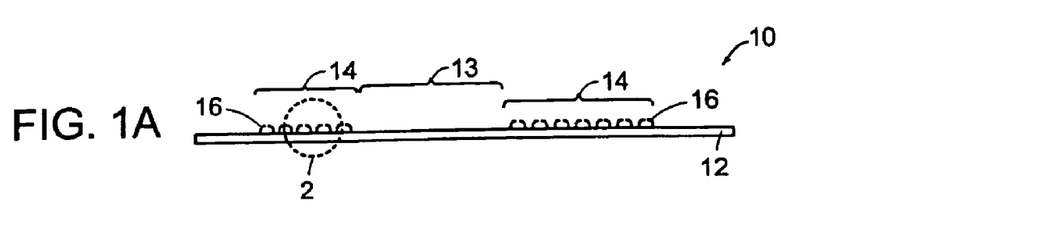
Figure 2:
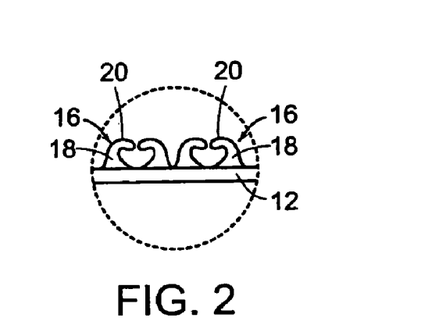
FIG. 2 is a sectional view of a barrier material with areas re moved for use in the method and apparatus of FIG. 1.
Figure 2A:
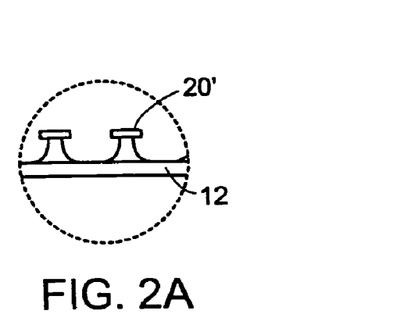
Figures 9, 9A:
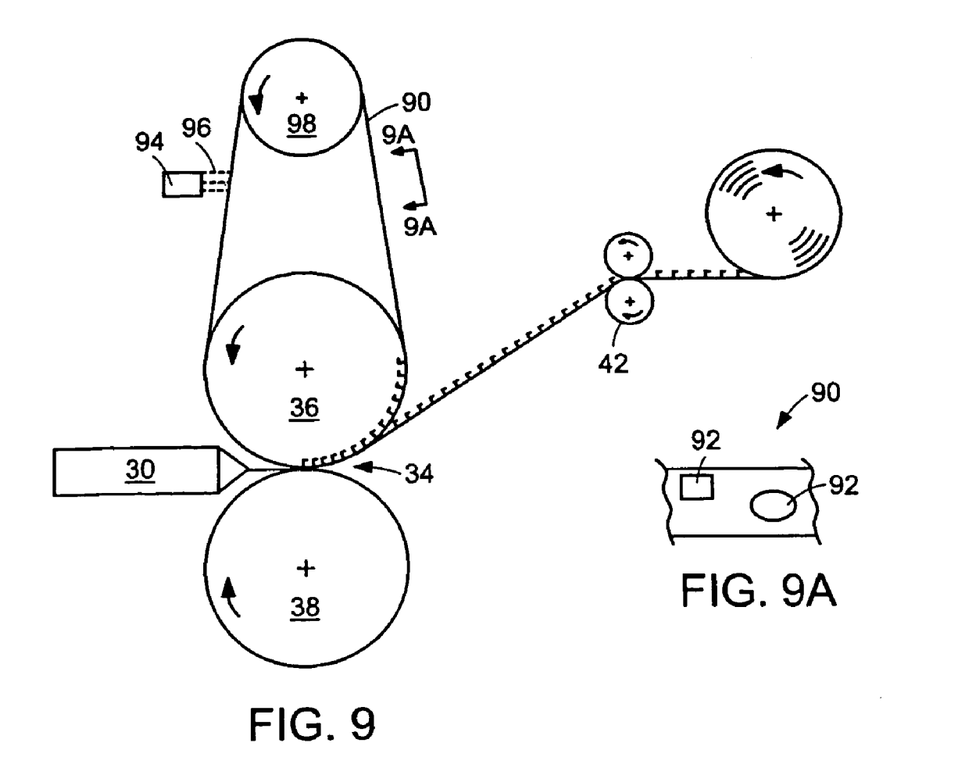

In yet another embodiment, illustrated in FIG. 9, an endless belt 90 is used in a manner similar to the sleeve described above with reference to FIGS. 8 and 8A (and FIG. 3). The belt, while also not being expended, allows for a more extensive series or pattern of apertures 92 than does the sleeve, due to its greater overall diameter, i.e., the peripheral surface area of the belt can be manifold greater than that of the sleeve simply by increasing the belt length, thus allowing for more apertures and more complex aperture patterns than the sleeve. As illustrated in FIG. 9, belt 90 is positioned to pass through nip 34 in a manner similar to barrier material 56 (FIG. 3), but, as the fastener product is stripped from mold roll 36, belt 90 is likewise continuously stripped, by belt roller 98, from the product itself. Optionally, and depending on the material chosen for belt 90, the surface of the belt can be continuously treated by application of a release agent 96 at, for 20 example, spray, drip, or wipe station 94. Again, product 10 of FIGS. 1 and 1A is illustrative of a typical product produced through use of belt 90, it being noted that more varied and complex patterns of apertures are possible than with sleeve 80.

Figure 10:
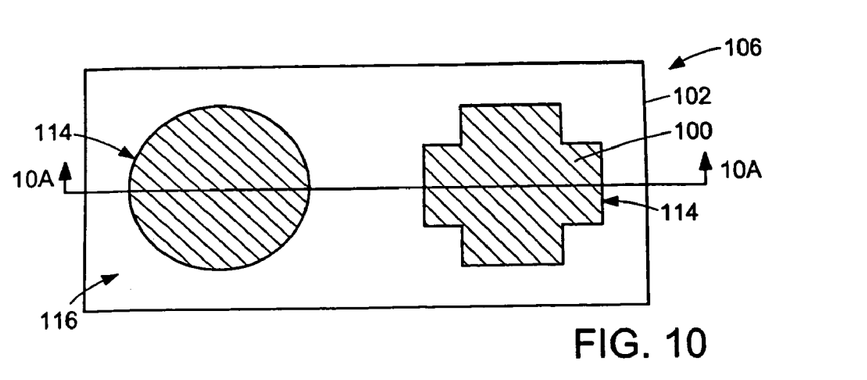
FIGS. 10 and 10A are, respectively, magnified, diagrammatic plan and cross-sectional views of a backing substrate having a lamination barrier.
Figure 10A:
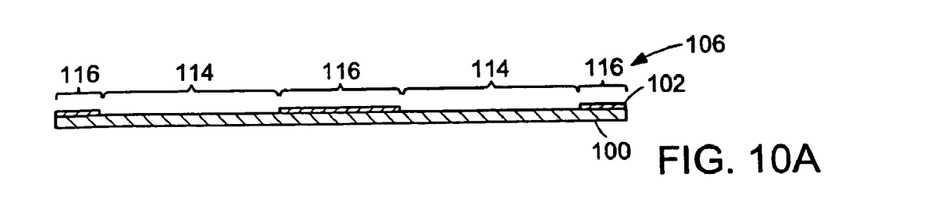
Figure 11:
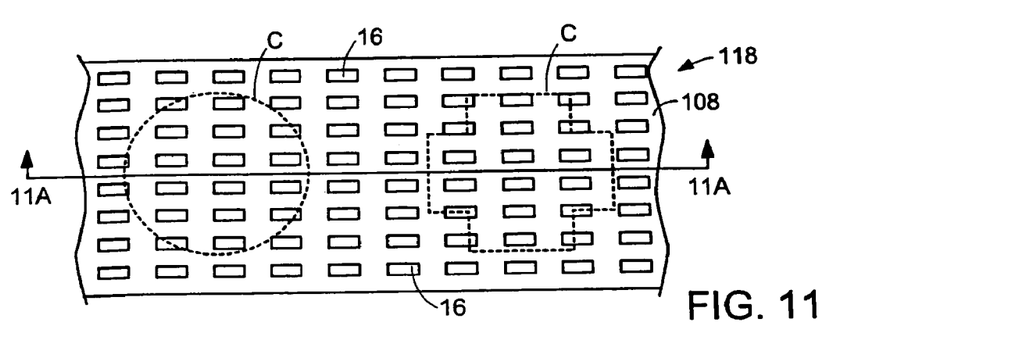
Figures 11A, 11B:
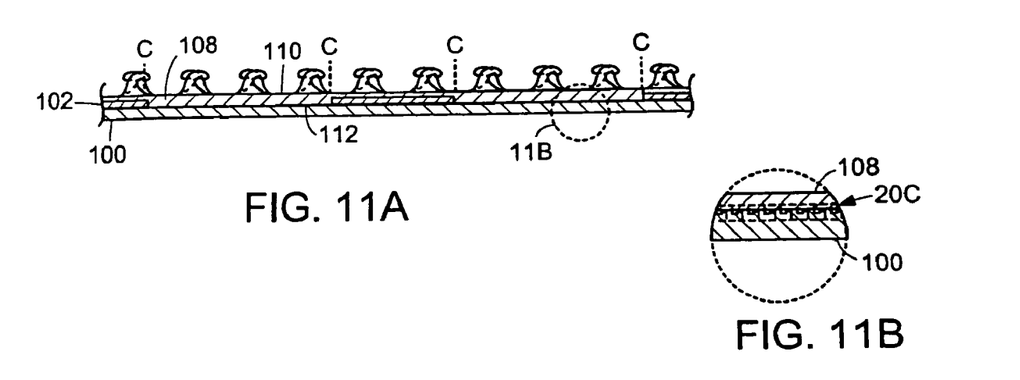

Referring again to FIG. 3, and now as well to FIGS. 10, 10A, 11, 11A, 11B and 12, yet another method for producing a product with discrete zones or regions of fastener elements (or stems) on a strip form base is achieved by introducing a backing substrate 100, such as a film, craft paper or other suitable material with a selectively applied lamination barrier 102 (see FIGS. 10 and 10A) into nip 34. Unlike the methods described above, this method does not require the use of a barrier material that blocks molten resin from entering selected mold cavities 40 30 of mold roll 36, but rather employs a lamination barrier to prevent lamination of the fastener element forming resin 32 to selected, treated regions of backing substrate 100. As illustrated by dashed lines in FIG. 3, in one example of the present method, lamination barrier 102 is printed onto desired areas of backing substrate 100 at a print station 104. Print station 104 can comprise rollers, a masked or unmasked sprayer, a controlled wiping or dripping device, or any other apparatus for applying lamination barrier 102 to backing substrate 100, in a patterned or unpatterned manner. The resulting composite 106 (i.e., substrate 100 with lamination barrier 102 as shown in FIGS. 10, 10A), having lamination barrier printed regions 114 and unprinted regions 116, is then introduced into nip 34 between molten resin 32 and pressure roll 38. Pressure in nip 34 forces resin 32 into all of the exposed mold cavities 40 of mold roll 36 to form fastener elements (or stems), while excess resin in the nip forms a resin layer that is pressed against composite 106.

The intermediate product 118 (FIGS. 11, 11A)that exits nip 34 includes underlying composite 106 (i.e., a strip-form base of the product) and a resin layer 108 with integrally molded fastener elements 16 (or stems, as described above) formed as protrusions from surface 110 of resin layer 108. Fastener elements 16 (or stems) are present across substantially one entire surface 110 of resin layer 108. Meanwhile, the surface 112 of resin layer 108 opposite the fastener elements 16 is permanently bonded to the unprinted regions 116, i.e., those areas that have not been coated with overprint material 102, of film 100, but resin layer 108 does not effectively bond to printed regions 114 of backing substrate 100. As illustrated more clearly in FIG. 11B, the bonding between resin layer 108 and backing substrate 100 in unprinted regions 116 occurs by the partial encapsulation of the resin with the backing, or the intermingling of mers of the resin layer and the backing substrate if both materials are polymeric, in encapsulation zone 200.

Figure 12:
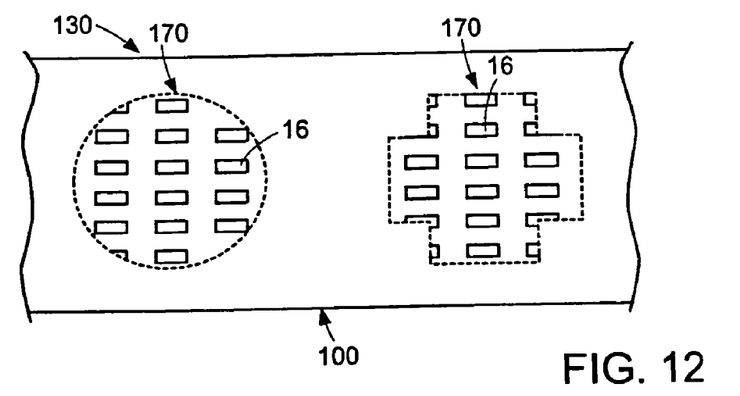
FIG. 12 is a magnified, diagrammatic plan view of a fastener product.

Referring also to FIG. 12, the portions of backing substrate 100 that have not been permanently bonded to resin layer 108 may then be removed at a station 120 (FIG. 3) by a number of methods such as, registering the bonded pattern of intermediate product 118 to a correspondingly shaped die cutter and "kiss" cutting, i.e., cutting only through the thermoplastic base substrate of the product along the perimeter of the unbonded regions 114 (cut along lines labeled C in FIGS. 11, 11A) while leaving the backing substrate intact, and stripping a way the unbonded thermoplastic base and its integrally attached fastener elements, i.e., removing the "ladder" portion. The result is a fastener product 130 including backing substrate 100 with longitudinally discrete regions 170 of fastener elements 16 each region being permanently bonded by a layer 108 of thermoplastic from resin which the fastener elements 16 (or stems) are integrally molded to extend. The removed ladder portion can then be recycled or, alternatively, used as a fastener product or as a component for another fastener product.

Figure 13:
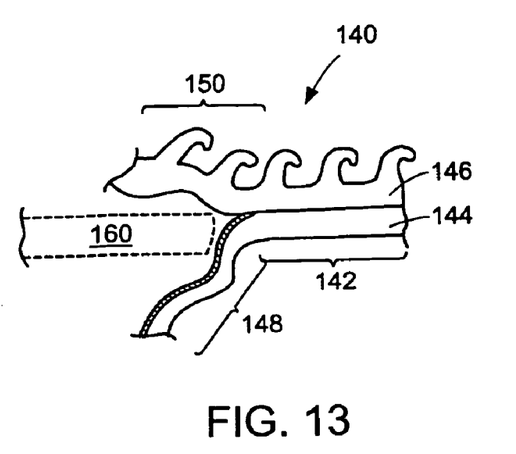
FIGS. 13 and 14 depicts a step in forming tab products.
Figure 14:
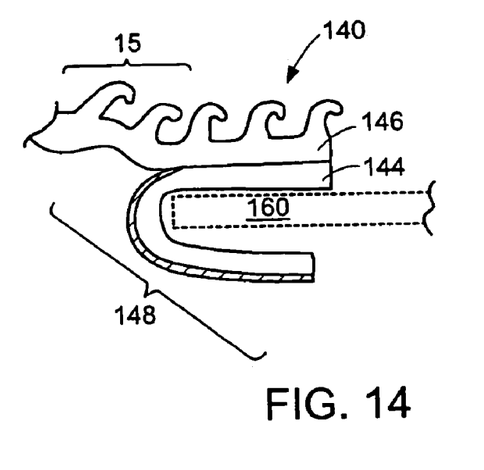

The lamination barrier technique described immediately above can be used to produce a tab product such as that illustrated in FIG. 13. Tab 140 has area 142 of backing substrate 144 permanently bonded to a fastener element-bearing, thermoplastic layer portion 146 while an unbonded area 148 of backing substrate 144 remains free from extension 150 of thermoplastic layer portion 146. Tab 140 can be attached to another substrate 160, e.g., a margin of a diaper laminate, by inserting a portion of substrate 160 between unbonded area 148 of backing substrate 144 and extension 150 of thermoplastic layer portion 146. Alternatively, as illustrated in FIG. 14, substrate 160 can be attached to tab 140 by positioning a portion of substrate 160 beneath bonded area 142 of backing substrate 144 and then folding unbonded area 148 of backing substrate 144 back beneath the portion of substrate 160. In either of the applications illustrated in FIGS. 13 and 14, the substrate portion can be attached to tab 140 by known methods, e.g., adhesive or other wise, to provide a fastening tab on substrate 160.

The lamination barrier technique described immediately above can employ various types of lamination barriers to prevent bonding of resin 32 with backing substrate 100. For example, various printing inks including varnish overprint are suitable. Such overprint coatings have melt-points that are substantially higher than most typical thermoplastic films, which can serve as a backing substrate 100. For example, printed packaging film will not thermally seal together if printing ink exists between seal layers. The ink needs only to exist on one film surface to prevent a seal from occurring. This anti-sealing aspect of printing ink or varnish overprint prevents lamination to occur during the fastener element forming process described above. This allows for the formation of discrete hook zones. Such hook zones can be produced by printing overprint on a backing substrate (such as polyethylene packaging films) everywhere hooks are not wanted. Once run through the fastener element forming process (FIG. 3), fastener elements are only laminated to areas of the backing substrate that are not coated with the overprint. These areas can then be registered to a die profile, "kiss cut" free from the backing substrate and the nonlaminated, i.e., unbonded, thermoplastic web stripped from the laminated, i.e., bonded, one. Thus yielding a backing substrate with permanently bonded hook zones on it. Any shape which can be printed and die cut can be thus manufactured.

An example of an appropriate overprint coating is an overprint varnish such as 20 that provided by ARCAR GRAPHICS as part #AWX5-92105401. An example of an appropriate backing substrate to which the overprint coating is selectively applied is an adhesive laminated packaging film such as a composite with one side being a 48 Ga. PET and the other side being a 2 mil (0.05 mm) thick polyethylene with 2-3% EVA, the polyethylene face surface treated to 40 dyne (40×10-M. Another example of an appropriate backing substrate to which the overprint coating can be applied is a paper known in the industry as 20#natural kraft.

For example, in using the packaging film composite as the backing substrate in the lamination barrier method described above with reference to FIG. 3, the packaging film is coated in discrete areas, e.g., with a coating thickness of as little as 0.001 inch (0.03 mm), with the above described overprint varnish, and subsequently the film is run with its uncoated PET face against the back-up roll, i.e., pressure roll 38 (FIG. 3). The film's partially coated polyethylene face is thereby positioned such as to wrap against the fastener element molding roll 36, but for the polyethylene resin 32 that is provided from the extruder head 30. This results in adding a layer of the extruded resin 32 to the packaging film's PE face just before the combined materials entry into the nip. Fastener elements (or stems) are then molded, e.g., in a uniform pattern across the width of the nip, by mold roll 36 from the extruded resin layer; the fastener elements (or stems) being securely anchored to the base packaging film in only those areas that were not treated with overprint varnish. The extrusion layer becomes virtually inseparable from the base packaging film's layer in these untreated areas. However, where the packaging film has been treated with the overprint varnish, the extrusion layer remains unbonded to the film. The overprint coated/ uncoated transition line produces a sharp, well-defined bond/ no-bond edge.

The backing substrate can be a web of virtually any material such as paper, plastic resin or cloth that can be printed with overprint. This means that the backing substrate can be of one material while the hooks can be of another. This allows each component to be selected based on downstream processing or functional need requirements. For example: a multi-layer substrate, could be selected for toughness, electrical conductivity and thermal salability (Nylon/AL/PE). Hook resin can be different from the backing substrate material, (PP hooks on a PE film allow PP hooks to be thermally bonded to PE film.)

A number of embodiments of the invention have been described. Nevertheless, it will be understood that various modifications may be made, without departing from the spirit and scope of the invention. For example, the technique for forming the fastener elements of the above described fastener products can be a multistep process wherein the molding operation involves the formation of stems only which are subsequently shaped to form engaging heads. Such techniques are known in the art, and the above methods can be used to form discrete regions of such stems on a substrate, the stems being later shaped to form engaging heads to thereby produce a fastener product with discrete regions of fastener elements. Accordingly, other embodiments are within the scope of the following claims.

What is claimed is:

1. A fastener product comprising:
    a longitudinally extending strip-form base; and
    a plurality of longitudinally discrete regions of fastener element stems carried by the strip-form base and disposed on a front surface thereof; and
    a barrier material bonded to the front surface of the base, exposed regions of the barrier material covering the base between the discrete regions of fastener element stems.

2. The fastener product of claim 1, wherein the base comprises
    a layer of resin from which the fastener element stems extend, and
    a backing substrate bonded to the layer of resin.

3. The fastener product of claim 2, wherein the barrier material is disposed on a face of the backing material in openings of the resin layer.

4. The fastener product of claim 1, wherein the barrier material comprises one of an overprint varnish and an overprint ink.

5. The fastener product of claim 1, wherein the barrier material comprises one of a fabric, a paper, or a film.

6. The fastener product of claim 1, wherein the barrier material comprises a fabric with engageable loops.

7. The fastener product of claim 1, wherein the fastener element stems have engaging heads.

8. The fastener product of claim 7, wherein the engaging heads are of molded form.

9. A fastener product comprising:
   a plurality of longitudinally discrete regions of molded, hook-shaped fastener elements, each discrete region comprising an associated resin base from which molded, hook-shaped fastener elements extend that is secured to a backing material by an intermingling of the resin of the base with the backing material, wherein
   each longitudinally discrete region is surrounded by an area of the backing material that is free of the resin.

10. The fastener product of claim 9, wherein the backing material comprises hook-engageable elements.

11. The fastener product of claim 10, wherein the backing material is selected from a group consisting of woven fabrics, nonwoven fabrics and knit fabrics.

12. A fastener product comprising:
   a longitudinally continuous base formed of thermoplastic resin; and
   a plurality of longitudinally discrete regions of fastener element stems integrally molded with and extending from a front surface of the base, the base having an exposed rear surface opposite the front surface from which the stems extend.

13. The fastener product of claim 12, wherein engaging heads extend longitudinally from the stems.

14. The fastener product of claim 13, wherein the engaging heads are molded with the stems.

15. The fastener product of claim 13, wherein the engaging heads are formed by a post-forming operation.

16. A fastener product comprising:
   a longitudinally extending strip-form base; and
   a plurality of longitudinally discrete regions of fastener element stems carried by the strip-form base and disposed on a front surface thereof; and
   a barrier material disposed on the front surface of the base and covering the base between discrete regions of fastener element stems,
   wherein the barrier material forms a lamination barrier, and
   wherein the lamination barrier comprises one of an overprint varnish and an overprint ink.

* * * * *